(12) United States Patent
Su et al.

(10) Patent No.: US 9,400,831 B2
(45) Date of Patent: Jul. 26, 2016

(54) PROVIDING INFORMATION RECOMMENDATIONS BASED ON DETERMINED USER GROUPS

(71) Applicant: Alibaba Group Holding Limited, George Town (KY)

(72) Inventors: Ningjun Su, Hangzhou (CN); Haijie Gu, Hangzhou (CN)

(73) Assignee: Alibaba Group Holding Limited (KY)

( * ) Notice: Subject to any disclaimer, the term of this patent is extended or adjusted under 35 U.S.C. 154(b) by 79 days.

(21) Appl. No.: 13/720,586

(22) Filed: Dec. 19, 2012

(65) Prior Publication Data

US 2013/0166564 A1 Jun. 27, 2013

(30) Foreign Application Priority Data

Dec. 27, 2011 (CN) .......................... 2011 1 0445052

(51) Int. Cl.
*G06F 17/30* (2006.01)
*G06Q 30/02* (2012.01)
*G06Q 10/08* (2012.01)
*G06Q 30/06* (2012.01)

(52) U.S. Cl.
CPC .......... *G06F 17/30598* (2013.01); *G06Q 10/08* (2013.01); *G06Q 30/02* (2013.01); *G06Q 30/06* (2013.01)

(58) Field of Classification Search
CPC ................................................ G06F 17/30707
USPC ........................................................ 707/740
See application file for complete search history.

(56) References Cited

U.S. PATENT DOCUMENTS

| 7,529,741 B2 | 5/2009 | Aravamudan et al. |
| 7,657,907 B2 * | 2/2010 | Fennan et al. .................. 725/46 |
| 7,814,029 B1 | 10/2010 | Siegel |
| 7,844,489 B2 * | 11/2010 | Landesmann ................ 705/14.1 |
| 7,921,042 B2 * | 4/2011 | Jacobi et al. ................. 705/26.7 |
| 8,341,158 B2 | 12/2012 | Acharya |

(Continued)

FOREIGN PATENT DOCUMENTS

| CN | 101833587 | 9/2010 |
| JP | 2005128673 | 5/2005 |
| WO | 2004017178 A2 | 2/2004 |

OTHER PUBLICATIONS

Yoshinobu Sakurai "Artist Recommendation for Expanding Musical Preference," The Papers of Technical Meeting, the Institute of Electrical Engineers of Japan (IEEJ), Jul. 30, 2009, pp. 115-120.

*Primary Examiner* — Scott A Waldron
*Assistant Examiner* — Dongming Wang
(74) *Attorney, Agent, or Firm* — Van Pelt, Yi & James LLP (57) ABSTRACT

Classifying a user into a user group is described, including: obtaining action record information associated with a user with respect to a plurality of information categories; determining a preference value for at least one of the plurality of information categories based at least in part on the action record information; determining a demand preference dispersion value for the user based at least in part on the preference value, wherein the demand preference dispersion value represents a degree to which the user has dispersed interest across the plurality of information categories; and determining whether the user is to be associated with a demand-focused user group based at least in part on the demand preference dispersion value.

21 Claims, 7 Drawing Sheets

(56) References Cited

U.S. PATENT DOCUMENTS

| | | |
|---|---|---|
| 8,392,432 B2 | 3/2013 | Wu et al. |
| 8,463,640 B2 | 6/2013 | Jang et al. |
| 8,498,992 B2 * | 7/2013 | Shishido et al. ............. 707/748 |
| 2004/0215552 A1 * | 10/2004 | Horn et al. .................. 705/38 |
| 2009/0198507 A1 * | 8/2009 | Rhodus ........................ 705/1 |
| 2009/0234712 A1 * | 9/2009 | Kolawa et al. ............... 705/10 |
| 2013/0054498 A1 | 2/2013 | Shah et al. |
| 2014/0089124 A1 * | 3/2014 | Jha et al. .................... 705/26.3 |

\* cited by examiner

PROVIDING INFORMATION RECOMMENDATIONS BASED ON DETERMINED USER GROUPS

CROSS REFERENCE TO OTHER APPLICATIONS

This application claims priority to People's Republic of China Patent Application No. 201110445052.6 entitled A METHOD AND SYSTEM OF DETERMINING USER GROUPS, INFORMATION QUERIES, AND RECOMMENDATIONS filed Dec. 27, 2011 which is incorporated herein by reference for all purposes.

FIELD OF THE INVENTION

The present application relates to the field of information recommendations. In particular, it relates to a technique for determining user groups and providing information recommendations based on determined user groups.

BACKGROUND OF THE INVENTION

Many types of users may shop at an e-commerce website. For example, there could be corporate users (e.g., users who are buying items on behalf of companies) and individual users (e.g., users who are buying items for personal use). Corporate users can be further categorized into raw materials merchants, manufacturers, wholesalers, retailers, and traders, for example. It is likely that the product interests of typical corporate users are more consistent and focused than those of individual users since the needs of a company may not vary much over time whereas people's personal interests may vary more often. It is also likely that the product interests of raw materials merchants and manufacturers are more concentrated than those of wholesalers, retailers, and traders, for example. Being able to identify the degree of concentration of a user's product interests, the user group to which a user belongs, and how product/information queries and recommendations are to be handled for each user group would greatly improve recommendations made to a user.

In typical systems, recommendations are generally made based on a user's historical preferences and/or correlations of interests among different users. But generally, typical recommendation systems do not differentiate between different types of users. For example, the same recommendation technique may be used by a typical recommendation system for both individual users and corporate users. For example, such recommendation systems may determine certain product/information categories whose webpages are frequently visited by users and then recommend highly rated and/or new products/information from these categories to users. Such recommendation systems may determine recommendations based on product/information correlations such as, for example, recommending for a user who is browsing the webpage of a first product, a second product that is related to the first product and/or a third product that is browsed by other users that are similar to that user. Additionally, typical recommendation systems treat recommendations for different types of users similarly.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Recommending information based on user group types is described herein. In various embodiments, each category of information or product at a website may be stored in a tree-type of data structure. Each category is associated with a set of information (e.g., associated with products under that product category). In the tree-type data structure, the categories are arranged in a hierarchy, in which sub-categories are arranged in the tree below at least one parent category. In various embodiments, "leaf categories" refer to the most detailed layer of categories and therefore do not have sub or child categories below them in the tree. The activities of users at the website are stored as action record information over time. For example, user activities may relate to a user's browsing of a webpage, a user's purchase of a product, and a user's submission of product and/or information feedback.

The action record information is analyzed to classify a user associated with the action record information into one of multiple user groups. In some embodiments, the theory of "information entropy" is used to classify a user into a certain type of user group. Information entropy is a concept used to measure uncertainty or randomness in information theory. The more ordered a system is, the lower its information entropy. Conversely, the more uncertain a system is, the greater its information entropy. In some embodiments, a user may be classified into one of a demand-focused user group or a demand-dispersed user group. In some embodiments, users of the demand-focused user group are considered to have more concentrated interest in a few product/information categories, whereas users of the demand-dispersed user group are considered to have more broad interest across several product/information categories. As such, information is recommended to a user of the demand-focused user group differently than a user from the demand-dispersed user group.

In some embodiments, also based at least in part on the action record information, one or more sets of clustered product information are determined. In some embodiments, in response to an indication to submit the product/information to a user associated with the demand-focused user group, at least a portion of the set of clustered product information is sent to the user.

Figure 1:
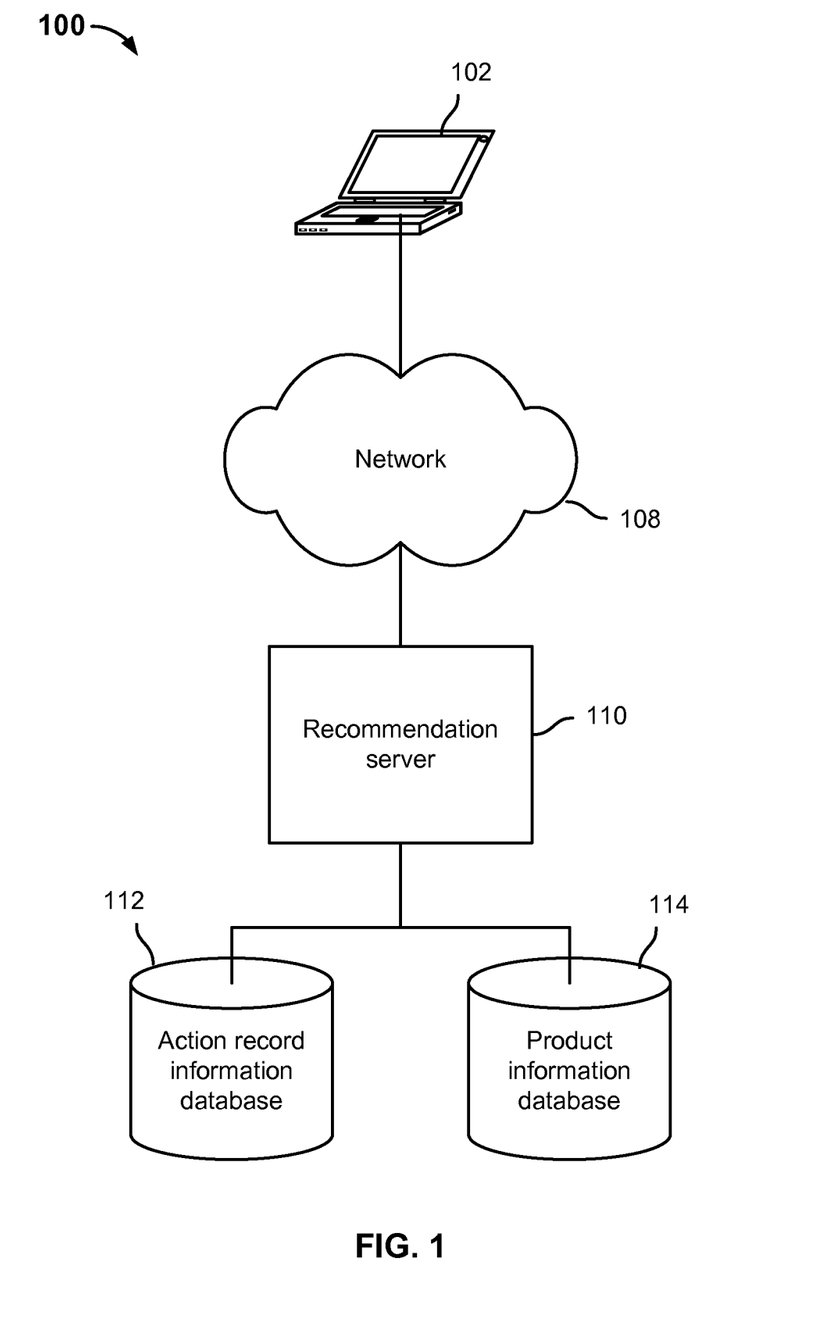
FIG. 1 is a diagram showing an embodiment of a system for recommending information based on user groups.

FIG. 1 is a diagram showing an embodiment of a system for recommending information based on user groups. In the example, system 100 includes device 102, network 108, recommendation server 110, action record information database 112, and product information database 114. Network 108 includes high-speed networks and/or telecommunications networks.

In some embodiments, a user using device 102 may browse a website supported by a web server (not shown) associated with recommendation server 110. For example, the website may comprise an e-commerce website. While device 102 is shown to be a laptop, other examples of device 102 may include a desktop computer, a tablet device, a smart phone, a mobile device, and/or any computing device. At least some activities performed by the user at the website may be tracked by recommendation server 110 and stored as action record information associated with the user at action record information database 112. Product information to be displayed at the e-commerce website may be stored at product information database 114. For example, there may be several product categories at the e-commerce website and a set of product information may be stored under each such product category at product information database 114. For example, each instance of a user activity stored at action record information database 112 may be associated with a product category.

In some embodiments, the user is classified by recommendation server 110 to be associated with a particular user group based on the user's stored action record information, as will be further discussed below. For example, the user may be determined to be in either of two user groups, a demand-focused user group or a demand-dispersed user group. The demand-focused user group includes users that have more concentrated interest (i.e., less dispersed interest) across fewer information categories while the demand-dispersed includes users that have broader interest (i.e., more dispersed interest) across more information categories.

In response to receiving an indication (e.g., from device 102) to recommend product information to the user, recommendation server 110 selects product information to recommend based on the user group to which the user belongs. As will be further described below, in the event that recommendation server 110 determines that the user is associated with the demand-focused user group, recommendation server 110 determines clustered product information to recommend to the user. Clustered product information includes portions of product information determined from the product categories using at least the action record information associated with the user. In some embodiments, a cluster of product information associated with a product category includes less than all of the information included in the product category. Otherwise, in the event that recommendation server 110 determines that the user is associated with the demand-dispersed user group, recommendation server 110 uses known information recommendation techniques to recommend information to the user.

Figure 2:
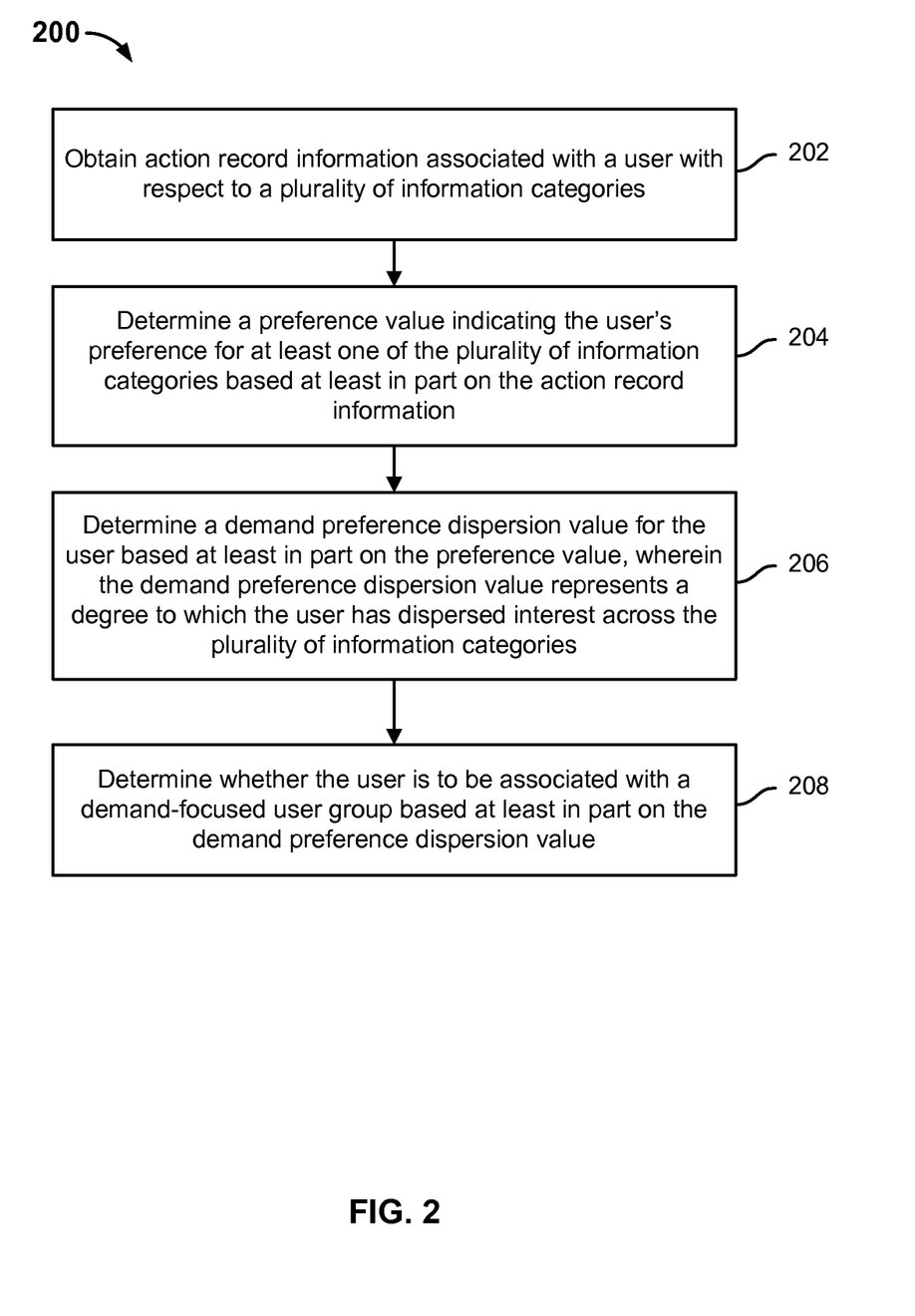
FIG. 2 is a flow diagram showing an embodiment of a process for classifying a user into a user group.

FIG. 2 is a flow diagram showing an embodiment of a process for classifying a user into a user group. In some embodiments, process 200 may be implemented at system 100. In some embodiments, the classification is performed based at least in part on the concept of "information entropy," as described above.

At 202, action record information associated with a user with respect to a plurality of information categories is obtained. The categories of information may comprise leaf categories of information arranged in a tree-type data structure, in some embodiments. In some embodiments, the categories of information comprise categories of product information of products sold at an e-commerce website. In some embodiments, the categories of information comprise categories of audio, visual, and/or visual information available at a multimedia website (e.g., a video streaming website). The categories of information may be of any type and are not limited to the examples of product and multimedia as described above.

In some embodiments, action record information associated with a user comprises the recorded data that describes the user's activities at the website associated with different information categories. For example, different types of user activities may relate to a user's browsing of a webpage, a user's purchase of a product, and a user's submission of product and/or information feedback. For example, each instance of a user activity may be recorded as one action record and a set of instances of user activities may be referred to as the action record information for that user. In some embodiments, each action record includes data indicating at least the user associated with the user activity, the type of the user activity, the webpage with which the interaction occurred, and the information category associated with that webpage. For example, if user Alice had visited a webpage associated with a tennis racquet that is for sale, then the corresponding stored action record would indicate that the user was Alice, the user had browsed a webpage, the visited webpage was for a tennis racquet, and that the product category associated with the webpage was that of sports equipment.

In some embodiments, such action record information may be recorded by the web browser used by the user and/or the web server associated with the website. In some embodiments, the action record information is stored by a device local to the user. In some embodiments, the action record information is stored by a remote server associated with the website.

In an example, assume that for user Alice, there are M product categories indicated within Alice's obtained action record information. M is an integer that is greater than or equal to 1.

At 204, a preference value indicating the user's preference is determined for at least one of the plurality of information categories based at least in part on the action record information. In some embodiments, a preference value associated with the user is determined for each information category. In some embodiments, to determine the preference value for each information category, the number of instances of user activities among the action record information is first counted. Then the preference value for a particular information category is the ratio of the number of instances of user activity among the action record information that is with respect to that information category to the total number of instances user activity among the action record information with respect to all of the information categories.

Returning to the previous example, a preference value P is determined for each of the M information categories. For example, the preference value for the ith information category of the M information categories may be represented by $P_i$. $P_i$ may be determined as [the number of instances of user activity among the action record information that is with respect to information category i]/[the total number of instances user activity among the action record information with respect to all of the M information categories]. Therefore, $0 \leq P_i \leq 1$.

In some embodiments, a preference value threshold may be set so that information categories whose respective preference values are less than the preference value threshold are not used to determine user groups. Therefore, only the information categories whose respective preference values that are equal to or greater than the preference value threshold are used to determine user groups. For example, of the M information categories, assume that only N information categories (where N≤M) are associated with respective preference values that are equal to or greater than the preference value threshold and so only N information categories will be used to determine user groups.

At 206, a demand preference dispersion value is determined for the user based at least in part on the preference value, wherein the demand preference dispersion value represents a degree to which the user has dispersed interest across the plurality of information categories.

Returning to the previous example, assume that the website is an e-commerce website, the N remaining information categories may be used to determine demand preference dispersion value H for the user. In one example, demand preference dispersion value H may be determined using a formula associated with information entropy. For example, demand preference dispersion value H for the user may be determined using the formula below:

$$H = -\Sigma_{i=1}^{N} P_i \log_2 P_i \quad (1)$$

Where H represents the demand preference dispersion value, N represents the number of information categories whose corresponding preference values are equal to or greater than the preference value threshold, and $P_i$ represents the preference value for information category i.

For example, below are several examples of calculating demand preference dispersion value H for the same preference values corresponding to different numbers of information categories:

1) Assuming there is only one information category for which preference value $P_i=1$, demand preference dispersion value $H=-1*\log_2(1)=0$.

2) Assuming there are two information categories for which the preference values are $P_i=0.5$ and $P_2=0.5$, demand preference dispersion value $H=-0.5*\log_2(0.5)-0.5*\log_2(0.5)=1$.

3) Assuming there are four information categories for which the preference values are $P_i=0.5$, $P_2=0.5$, $P_3=0.5$, $P_4=0.5$, demand preference dispersion value $H=4*(-0.25*\log_2(0.25))=2$.

As is shown in the above examples, information entropy and therefore demand preference dispersion value H are directly correlated to the number of information categories for which the preference value is greater than 0. In other words, information entropy and therefore demand preference dispersion value H increases with the number of information categories whose preference values are greater than 0.

For example, realistically, user preference value may vary from information category to information category. Below are several examples of calculating demand preference dispersion value H for different preference values corresponding to different numbers of information categories:

Assume that three users (User A, User B, and User C) each have preference value of greater than 0 for each of information category 1, information category 2, and information category 3.

If User A's preference value ratios for the three information categories are 0.3, 0.3 and 0.4, respectively, then User A's demand preference dispersion value $H=-0.3*\log_2(0.3)-0.3*\log_2(0.3)-0.4*\log_2(0.4)=1.57$.

If User B's preference value ratios for the three information categories are 0.2, 0.2 and 0.6, respectively, then User B+s demand preference dispersion value $H=-0.2*\log_2(0.2)-0.2*\log_2(0.2)-0.6*\log_2(0.6)=1.22$.

If User C's preference value ratios for the three information categories are 0.05, 0.1 and 0.85, respectively, then User B's demand preference dispersion value $H=-0.05*\log_2(0.05)-0.1*\log_2(0.1)-0.85*\log_2(0.85)=0.75$.

Thus, it is clear that the more user actions that are concentrated on a few number of categories, the smaller the entropy value and hence the demand preference dispersion value will be. So, entropy value and hence the demand preference dispersion value decrease as user demand focus increases.

At 208, it is determined whether the user is to be associated with a demand-focused user group based at least in part on a demand preference dispersion threshold value. In some embodiments, a demand preference dispersion threshold value is set such that a user associated with a demand preference dispersion value that is less than or equal to the demand preference dispersion threshold value is determined to be classified into the demand-focused user group and that a user associated with a demand preference dispersion value that is greater than the demand preference dispersion threshold value is determined to be classified into the demand-dispersed user group. In some embodiments, information associating the user with either the demand-focused user group or the demand-dispersed user group is recorded.

Returning to the previous example where the respective demand preference dispersion values for User A, User B, and User C are 1.57, 1.22, and 0.75, if the demand preference dispersion value is set to 1, then User C is associated with the demand-focused user group, and Users A and B are added to the demand-dispersed user group.

After users are classified in either the demand-focused user group or the demand-dispersed user group, different information recommendation techniques may be applied for the respective user groups.

Figure 3:
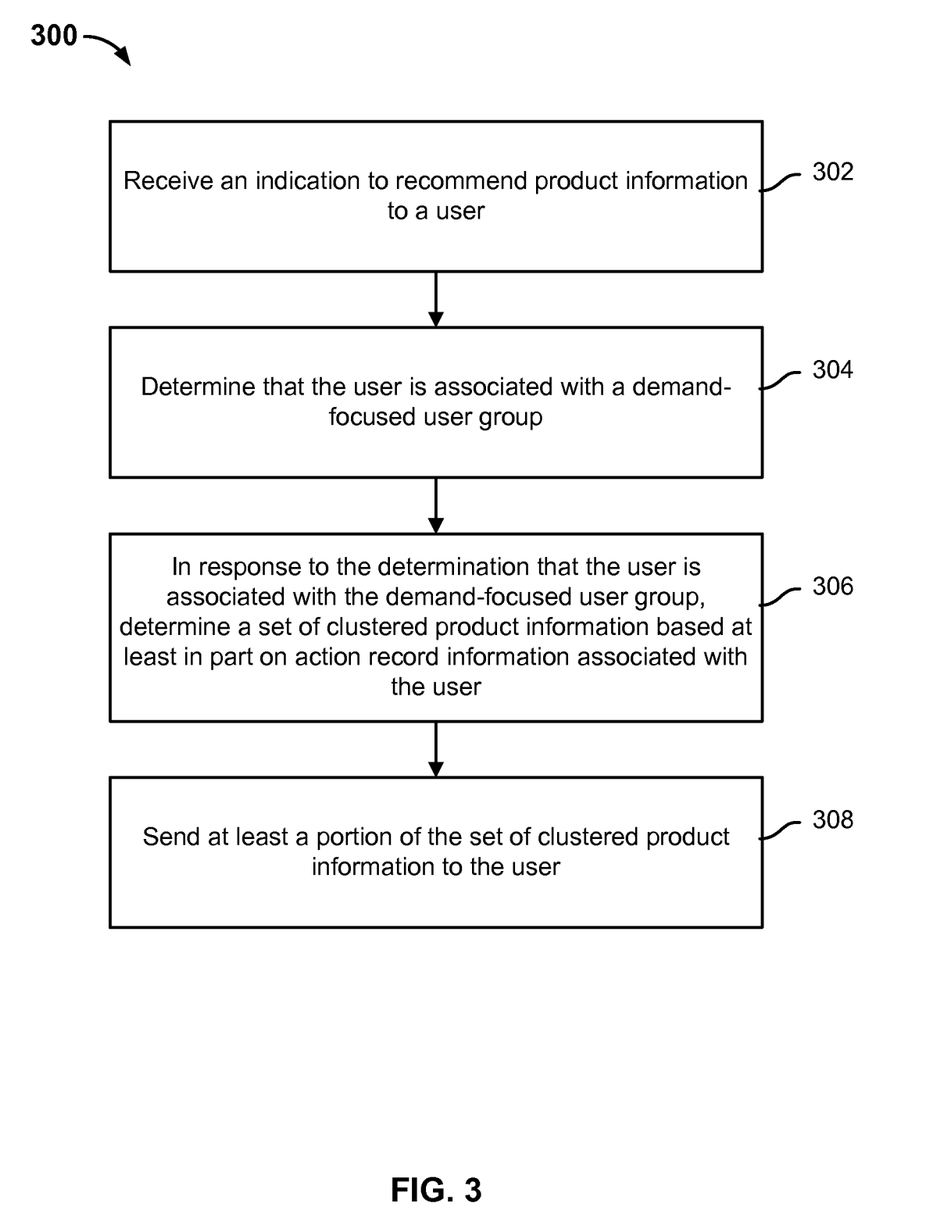
FIG. 3 is a flow diagram showing an embodiment of a process for recommending product information to a user based on a user group associated with the user.

FIG. 3 is a flow diagram showing an embodiment of a process for recommending product information to a user based on a user group associated with the user. In some embodiments, it is first determined whether the user is associated with a demand-focused user group. In some embodiments, if the action record information is associated with an e-commerce website, clustered product information is the type of information that is recommended to a user associated with a demand-focused user group in the event there is an opportunity to recommend information to the user. In some embodiments, a cluster of product information comprises a portion of product information within a product category that is determined to represent the product category. In some embodiments, a cluster of product information includes certain keywords based at least in part on the action record information associated with the user.

Process 300 is used to determine clustered product information to recommend to the user associated with a demand-focused user group in response to an opportunity to recommend information to the user. In some embodiments, process 300 can be performed on system 100.

At 302, an indication to recommend product information to a user is received. For example, an indication to recommend product information to a user may be generated when the user makes a selection for recommended products. In another example, an indication to recommend product information to a user may be generated as the user is browsing various webpages at the e-commerce website. In yet another example, an indication to recommend product information to a user may be generated when the user first logs into the e-commerce website.

At 304, the user is determined to be associated with a demand-focused user group. In some embodiments, whether the user is associated with the demand-focused user group may be determined based at least in part on recorded information. For example, a user may be determined to be either in the demand-focused user group or the demand-dispersed user group using a process such as process 200 of FIG. 2.

In the event that the user is determined to be associated with the demand-dispersed user group, then product recommendations may be determined based on known product recommendation techniques, which will not be further described below.

In the event that the user is determined to be associated with the demand-focused user group, then product recommendations may be determined based on the action record information associated with the user, which will be further described below.

At 306, in response to the determination that the user is associated with the demand-focused user group, a set of clustered product information is determined based at least in part on action record information associated with the user.

Because each product category contains potentially hundreds or even thousands of pieces of product information and users of the demand-focused user group are considered to have more concentrated demand on relatively fewer products, product information that is recommended to the user associated with the demand-focused user group may first be clustered to form smaller sets of product information that may be recommended to the user. A piece of product information in a product category may include a product title, a product description, a price, information associated with the seller of the product, etc., for example. In some embodiments, determining a cluster of product information for a user includes finding a subset of product information under each product category, where the subset of product information is determined to be potentially of greater interest to the user than the rest of the product information not in the subset. In some embodiments, clustered product information is determined based at least in part on the action record information associated with the user. As a result of clustering product information, each cluster of product information is smaller than an entire product category and clusters of product information may be queried and recommended to the user instead of searching through all the product information of the product category for each recommendation opportunity.

One example of a technique of clustering product information is as follows:

Assume that there are S product categories from which clustered product information is to be determined, where S is an integer greater than or equal to 1.

First, word segmentation is performed on product titles and product information descriptions included in each product category in S product categories.

Second, a set of keywords of product information is determined for each product category. A keyword may include one or more phrases. For example, the set of keywords for a product category may include keywords that appear most frequently and/or have the most influence of the keywords within a product category. The keywords may be specified manually by one who inputs product information into the system, or extracted automatically by evaluating the frequency of appearance and/or influence of the words. The keywords that are identified to have the most influence may be identified using the action record information associated with the user. For example, the action record information may include keywords included in user queries and keywords that were clicked on by the user and such action information may be used by a known influence determination technique to determine the keywords of the greatest influence.

Third, pieces of product information that include at least one of the set of keywords for a product category are included in a cluster of product information for that product category.

The following is an example of using the example technique of clustering product information described above:

For the product category of "Shirts," the following is a product title from that category: winter fashion Leisure fleece checkered shirt Long-sleeved shirt padded men's shirt.

1. Word segmentation is performed on the product title to yield the following keywords: winter fashion, leisure, fleece, checkered, shirt, men's, long-sleeved, padded.

2. Pattern mining techniques are performed to extract those keywords that appear the most frequently and that have relatively more influence.

Assume that the words found to occur the most often (e.g., among all product categories or among only the product category of "Shirt's") are: leisured, checkered, shirt, and winter fashion.

3. The user's action record information, which includes, for example, past user queries, past keywords clicked on by the user, is used to identify influential attribute words.

Assume that the words most often searched and/or otherwise indicated to have been interacted with by the user (and therefore the keywords assumed to have the most influence) include: men's, long-sleeved.

4. The keywords determined above to appear the most frequently and the keywords determined above to have the most influence are combined into a set of keywords for the product category. The set of keywords include: leisure, checkered, shirt, winter fashion, men's, long-sleeved.

5. Under the "Shirts" product category, all pieces of product information whose product title includes at least some of the set of keywords above are classified into one cluster of product information. In some embodiments, a relationship between the cluster of product information and the set of keywords is recorded.

As shown above, each cluster of product information includes a subset of product information from a product category that may include a representative portion of the product category. In some embodiments, clusters of product information are sent as product recommendations to the user instead of individual pieces of product information found in product categories in response an opportunity to recommend product information to the user associated with the demand-focused user group. For example, because a cluster of product information includes less product information than all the product information included in a product category, searching through clusters of product information to recommend to a user may be faster and therefore more efficient than searching through individual pieces of product information within product categories. (For example, if the user were associated with the demand-dispersed user group, then individual pieces of product information may be searched instead of using clustered product information).

At 308, at least a portion of the set of clustered product information is sent to the user. In some embodiments, a portion of the set of clustered product information is sent as recommendations to the user. In some embodiments, the portion of the set of clustered product information includes the subset of the set of clustered product information that is determined to be preferred by the user associated with the demand-focused user group. In some embodiments, the user's action record information is used to determine the clusters of product information that the user prefers.

The following is an example of a technique for determining a subset of user-preferred clustered product information:

First, the user activities of the user's action record information that pertain to each cluster of product information are determined. For example, any user activity (e.g., user searches, user submission of feedback, user clicks) for a piece of product information (e.g., associated with a product) associated with a cluster of product information is determined to be associated with that cluster of product information.

Second, the user's action record information is counted with respect to each cluster of product information. For example, counting the action record information with respect to a particular cluster of product information includes aggregating all user activities included in the action record information associated with pieces of product information that are included in the cluster of product information. For example, assume that there is a set of L clusters of product information. For each of the L clusters of product information, action record information with respect to the cluster of product information is counted to determine visit volume P (the number of total user visits associated with all pieces of product information included in the cluster of product information) and visit frequency F over a predetermined period of time (the number of total user visits associated with all pieces of product information included in the cluster of product information over the predetermined period of time). For example, each piece of product information may be presented at a webpage. For example, assume that the visit volume is the total number of visits within a 30-day period to all pieces of product information in cluster product information A:

$$P=P1+P2+\ldots P30$$

Where P1 represents the visit volume to any piece of product information in cluster product information A on the first day of the 30-day period, P2 represents the visit volume to any piece of product information in cluster product information A on the second day of the 30-day period, and so forth.

Also, for example, assume that the visit frequency is the ratio between the number of days that any piece of product information in cluster product information A is visited to the 30 days of the period:

$$F=n/30$$

Where n is the number of days within the 30-day period that any piece of product information in cluster product information A is visited.

Third, the clusters of product information whose corresponding visit volume P is less than a visit volume threshold and/or visit frequency F is less than a frequency threshold are filtered out (i.e., ignored and/or discarded). Filtering is performed to remove the clusters of product information that are considered to be less often and/or frequently visited by the user. The remaining clusters of product information that are not filtered out are considered to be the subset of user-preferred clustered information that is eligible to be sent to the user as recommendations. Assume that of the L clusters of product information, R clusters of product information are associated with a respective visit volume and/or a respective frequency that are less than the respective visit volume threshold and/or the frequency threshold, therefore only the remaining (L−R) clusters of product information are eligible to be sent to the user as recommendations.

In some embodiments, the eligible subset of user-preferred clustered product information is ranked based on either their respective visit volumes or their respective visit frequencies. The top N ranked clusters of product information are then sent to the user as recommendations.

Figure 4:
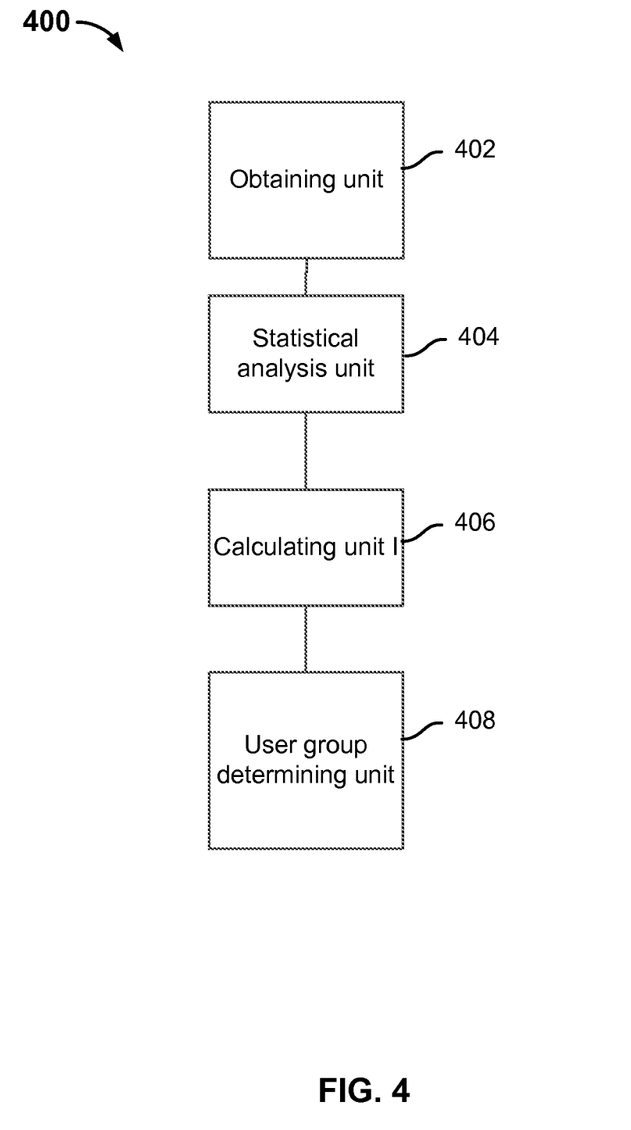
FIG. 4 is a diagram showing an embodiment of a system for classifying a user into a user group.

FIG. 4 is a diagram showing an embodiment of a system for classifying a user into a user group. In the example, system 400 includes obtaining unit 402, statistical analysis unit 404, calculating unit I 406, and user group determining unit 408.

The units can be implemented as software components executing on one or more processors, as hardware such as programmable logic devices and/or Application Specific Integrated Circuits designed to perform certain functions, or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices.

Obtaining unit 402 is configured to obtain the action record information associated with a user with respect to a plurality of information categories.

Statistical analysis unit 404 is configured to count instances of user activity within the action record information and to obtain a preference value for each information category. In some embodiments, the preference value for a particular information category is the ratio of the number of instances of user activity among the action record information that is with respect to that information category to the total number of instances user activity among the action record information with respect to all of the information categories.

Calculating unit I 406 is configured to determine the demand preference dispersion value for the user based on the determined preference values corresponding to the plurality of information categories.

User group determining unit 408 is configured to compare the demand preference dispersion value to a demand preference dispersion value threshold and to add the user to a demand-focused user group in the event the demand preference dispersion value is less than or equal to the demand preference dispersion value threshold.

In some embodiments, system 400 further includes:

A filtering unit that is configured to filter out information categories corresponding to preference values that are less than a preference value threshold and to obtain the remaining information categories corresponding to preference values that are greater than or equal to the preference value threshold.

A calculating unit II that is configured to determine the demand preference dispersion value for the user from the preference values corresponding to the information categories that were not filtered out by the filtering unit based on their respective preference values.

Figure 5:
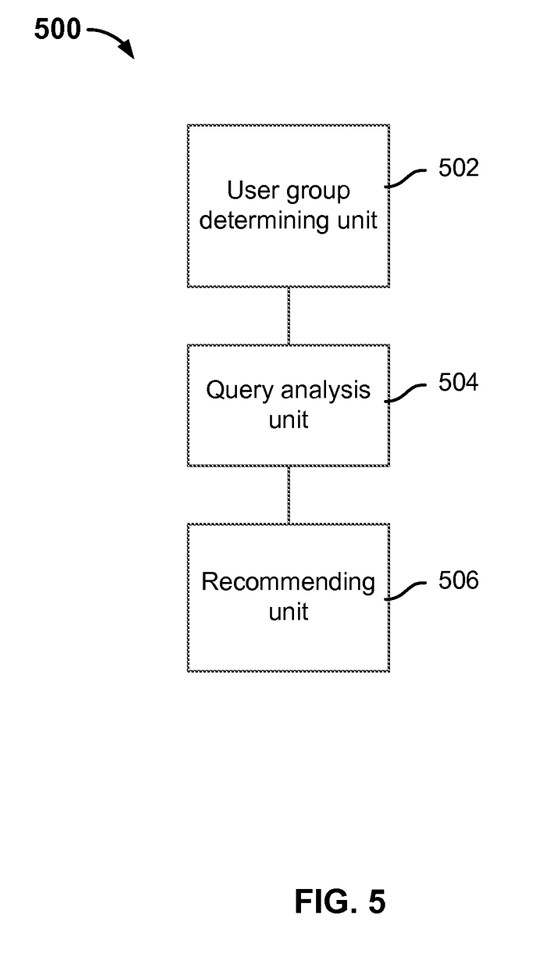
FIG. 5 is a diagram showing an embodiment of a system for recommending product information to a user based on a user group associated with the user.

FIG. 5 is a diagram showing an embodiment of a system for recommending product information to a user based on a user group associated with the user. In the example, system 500 includes user group determining unit 502, query analysis unit 504, and recommending unit 506.

User group determining unit 502 is configured to determine that a user belongs to the demand-focused user group based on the demand preference dispersion value determined for the user.

Query analysis unit 504 is configured to determine a set of clustered product information based at least in part on the action record information associated with the user associated with the demand-focused user group.

Recommending unit 506 is configured to recommend at least a portion of the clustered product information for the user.

Figure 6:
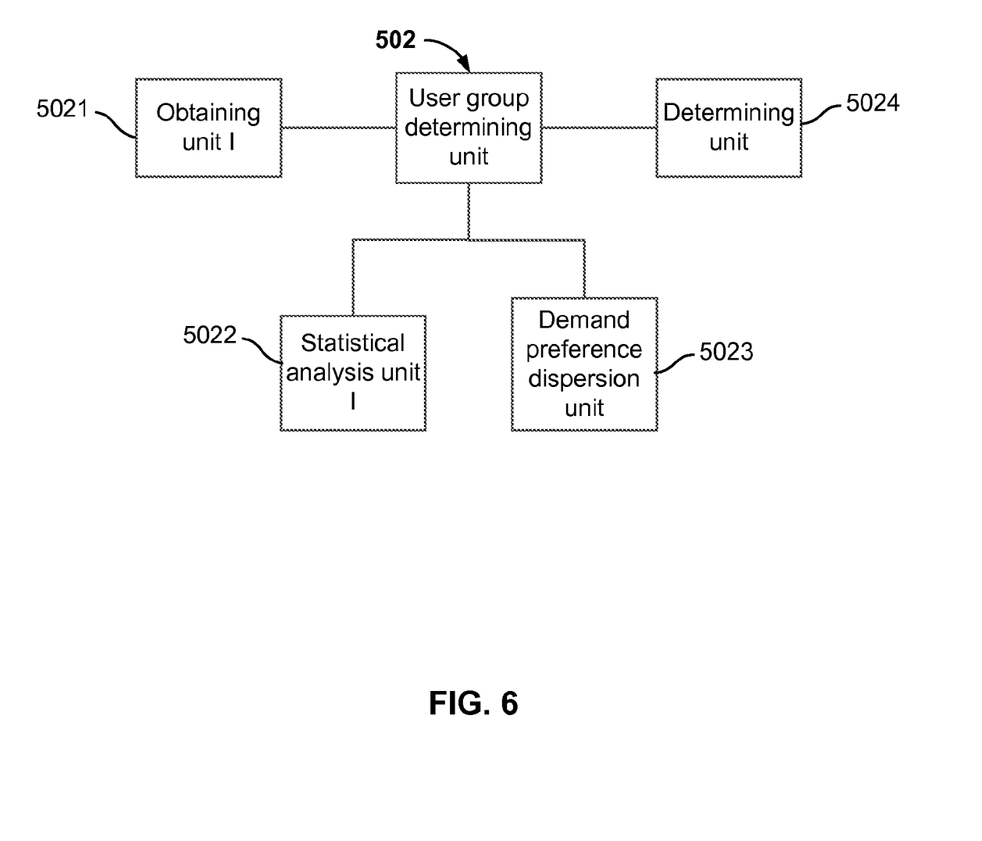
FIG. 6 is a diagram showing an example of a user group determining unit.

FIG. 6 is a diagram showing an example of a user group determining unit. In some embodiments, user group determining unit 502 of system 500 of FIG. 5 is implemented using the example.

Obtaining unit I 5021 is configured to obtain the action record information of a user with respect to a plurality of information categories.

Statistical analysis unit I 5022 is configured to determine preference values corresponding to the plurality of information categories.

Demand preference dispersion unit 5023 is configured to determine the demand preference dispersion value associated with the user based on the determined preference values corresponding to the plurality of information categories.

Determining unit 5024 is configured to compare the demand preference dispersion value to a demand preference dispersion value threshold and to add the user to a demand-focused user group in the event the demand preference dispersion value is less than or equal to the demand preference dispersion value threshold.

In some embodiments, the user group determining unit further includes:

A clustering unit that is configured to determine a set of clustered product information from a plurality of product categories based on the action record information associated with a user.

In some embodiments, the clustering unit specifically comprises:

A word segmentation unit that is configured to perform word segmentation on product titles and information descriptions included in each product category.

A keyword extracting unit that is configured to extract keywords of product information included in each product category.

A product information clustering unit that is configured to include the product information that contains at least some of the keywords in each product category into a cluster of product information.

Figure 7:
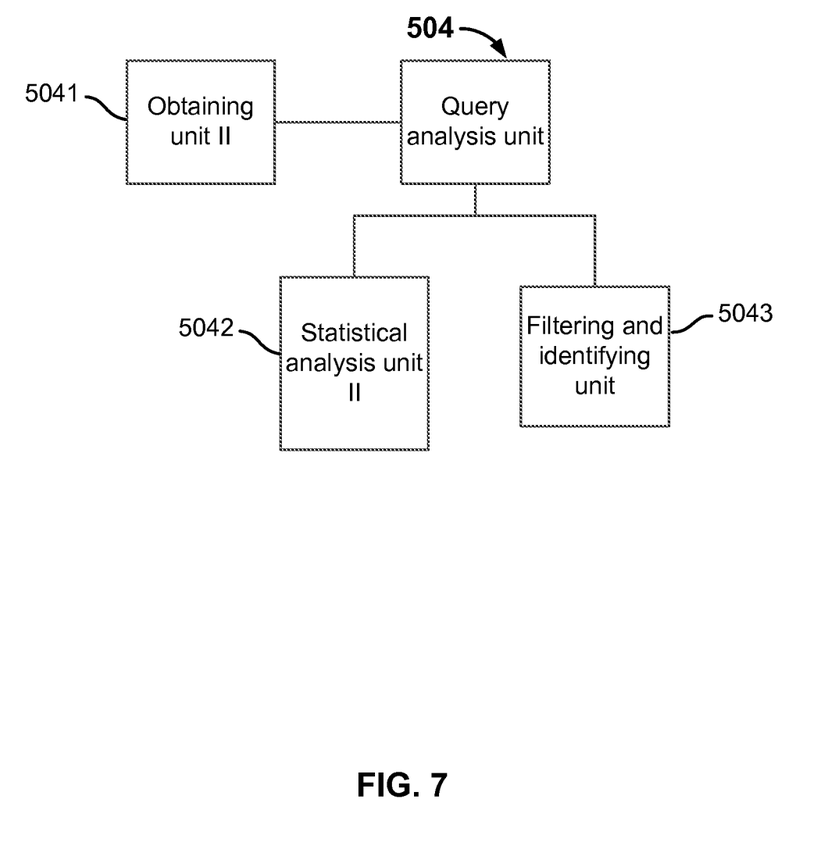
FIG. 7 is a diagram showing an example of a query analysis unit

FIG. 7 is a diagram showing an example of a query analysis unit. In some embodiments, query analysis unit 504 is implemented using the example.

Obtaining unit II 5041 is configured to obtain action record information associated with the user with respect to a plurality of product categories.

Statistical analysis unit II 5042 is configured to analyze the action record information and obtain the visit volume P associated with each cluster of product information and the visit frequency F associated with each cluster of product information within a predetermined period of time.

Filtering and identifying unit 5043 is configured to filter out the clusters of product information corresponding to visit frequency values that are less than a visit frequency threshold value and/or visit volumes less than a visit frequency threshold value. Those clusters of product information that are not filtered out are considered to be user-preferred and eligible to be recommended to the user.

The present application has, thanks to the technical solutions provided by one or more embodiments, at least one of the following beneficial technical results or advantages:

The present application draws upon the concept of "information entropy" to identify user demand preference dispersion and thereby precisely determines whether a user belongs to a demand-focused group or to a demand-dispersed group.

Although embodiments of the present invention have already been described, a person skilled in the art can make other modifications or revisions to these embodiments once he grasps the basic creative concept. Therefore, the attached claims are to be interpreted as including the described embodiments as well as all modifications and revisions falling within the scope of the present invention.

Obviously, persons skilled in the art can subject the present invention to various changes and variations without departing from the spirit and scope of the present invention. Thus, if these modifications to and variations of the present invention lie within the scope of its claims and equivalent technologies, then the present invention intends to cover these changes and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for classifying a user into a user group, comprising:
  one or more processors configured to:
    obtain action record information associated with a user with respect to a plurality of information categories, the plurality of information categories including a first information category and a second information category;
    determine a plurality of preference values indicating the user's preferences for the plurality of information categories, the determination being made based at least in part on the action record information, the plurality of preference values including a first preference value and a second preference value, the first preference value relating to the first information category, the second preference value relating to the second information category;
    determine a demand preference dispersion value for the user based at least in part on the plurality of preference values, wherein the demand preference dispersion value represents a degree to which the user has dispersed interest across the plurality of information categories, and wherein to determine the demand preference dispersion value comprises to:

compare the first and second preference values each with a preference value threshold; and in the event that the first and second preference values both are greater than or equal to the preference value threshold:

determine a first entropy value based at least in part on a formula and the first preference value;

determine a second entropy value based at least in part on the formula and the second preference value; and determine the demand dispersion preference value based on the first entropy value and the second entropy value;

determine whether the user is to be classified with a demand-focused user group based at least in part on the demand preference dispersion value; and one or more memories coupled to the one or more processors and configured to provide the one or more processors with instructions.

2. The system of claim 1, wherein the preference value is determined based on a ratio of a number of instances of user activity included in the action record information associated with the information category to a total number of instances of user activity included in the action record information associated with the plurality of information categories.

3. The system of claim 1, wherein the demand preference dispersion value is determined as:

$$H = \Sigma_{i=1}^{N} P_i \log_2 P_i$$

wherein H represents the demand preference dispersion value, N represents the number of plurality of information categories, and $P_i$ represents the preference value for information category i.

4. The system of claim 1, wherein the one or more processors are further configured to filter out an information category of the plurality of information categories associated with a preference value that is less than a preference value threshold.

5. The system of claim 1, wherein determining whether the user is to be associated with a demand-focused user group based at least in part on the demand preference dispersion value includes:

determining that the user is to be associated with the demand-focused user group in the event that the demand preference dispersion value is less than or equal to the demand preference dispersion threshold value; and determining that the user is to be associated with a demand-dispersed user group in the event that the demand preference dispersion value is greater than the demand preference dispersion threshold value.

6. The system of claim 1, wherein the one or more processors are further configured to:

receive an indication to recommend product information to the user;

determine that the user is associated with the demand-focused user group;

in response to the determination that the user is associated with the demand-focused user group, determine a set of clustered product information based at least in part on the action record information associated with the user; and send at least a portion of the set of clustered product information to the user as recommended product information.

7. The system of claim 6, wherein the plurality of information categories comprises a plurality of product categories, the set of clustered product information is determined based at least in part on extracting for a product category of the plurality of product categories, a set of keywords, and determining a cluster of pieces of product information included in the product category that include at least some of the set of keywords.

8. The system of claim 6, wherein:

at least the portion of the set of clustered product information is determined based at least in part on determining visit volumes and visit frequencies corresponding to the set of clustered product information; and determining the portion of the set of clustered product information that is associated with visit volumes that are equal to or exceed a visit volume threshold value and that is associated with visit frequencies that are equal to or exceed a visit frequency threshold value.

9. The system of claim 1, wherein the one or more processors is further configured to:

in the event that the user is classified with the demand-focused user group, determine a set of clustered product information from product information comprising a plurality of pieces of product information, wherein each piece of product information is associated with a product category and comprises a product title and a product description, to determine the set of clustered product information comprises to:

perform word segmentation on the product titles and the product descriptions to determine a representative set of keywords for each product category;

select from the representative set of keywords a set of influential keywords for each product category based at least in part on the action record information associated with the user;

include a piece of product information in the set of clustered product information in the event the product information includes at least one of the keywords in the set of influential keywords; and send at least a portion of the set of clustered product information to the user as recommended product information.

10. The system of claim 9, wherein in the event that the user is classified with the demand focused user group, the one or more processors are further configured to:

obtain the action record information associated with each cluster of product information in the set of clustered product information; and analyze the action record information associated with each cluster of product information to identify the at least the portion of the set of clustered product information to be recommended to the user.

11. The system of claim 1, wherein the one or more processors is further configured to:

receive an indication to recommend product information to the user;

determine whether the user is associated with the demand-focused user group;

in response to the determination that the user is associated with the demand-focused user group, determine recommended product information based on a first method; and in response to the determination that the user is not associated with the demand-focused user group, determine recommended product information based on a second method.

12. A method for classifying a user into a user group, comprising:

obtaining action record information associated with a user with respect to a plurality of information categories, the plurality of information categories including a first information category and a second information category;

determining a plurality of preference values indicating the user's preferences for the plurality of information categories, the determination being made based at least in part on the action record information, the plurality of preference values including a first preference value and a second preference value, the first preference value relating to the first information category, the second preference value relating to the second information category;

determining a demand preference dispersion value for the user based at least in part on the plurality of preference values, wherein the demand preference dispersion value represents a degree to which the user has dispersed interest across the plurality of information categories, and wherein the determining of the demand preference dispersion value comprises:
  comparing the first and second preference values each with a preference value threshold; and
  in the event that the first and second preference values both are greater than or equal to the preference value threshold:
    determining a first entropy value based at least in part on a formula and the first preference value;
    determining a second entropy value based at least in part on the formula and the second preference value;
and determining, using one or more processors, whether the user is to be classified with a demand-focused user group based at least in part on the demand preference dispersion value.

13. The method of claim 12, wherein the preference value is determined based on a ratio of a number of instances of user activity included in the action record information associated with the information category to a total number of instances of user activity included in the action record information associated with the plurality of information categories.

14. The method of claim 12, wherein the demand preference dispersion value is determined as:

$$H = \Sigma_{i=1}^{N} P_i \log_2 P_i$$

wherein H represents the demand preference dispersion value, N represents the number of plurality of information categories, and $P_i$ represents the preference value for information category i.

15. The method of claim 12, further comprising filtering out an information category of the plurality of information categories associated with a preference value that is less than a preference value threshold.

16. The method of claim 12, wherein determining whether the user is to be associated with a demand-focused user group based at least in part on the demand preference dispersion value includes determining that the user is to be associated with the demand-focused user group in the event that the demand preference dispersion value is less than or equal to the demand preference dispersion threshold value and determining that the user is to be associated with a demand-dispersed user group in the event that the demand preference dispersion value is greater than the demand preference dispersion threshold value.

17. The method of claim 12, further comprising:
  receiving an indication to recommend product information to the user;
  determining that the user is associated with the demand-focused user group;
  in response to the determination that the user is associated with the demand-focused user group, determining a set of clustered product information based at least in part on the action record information associated with the user; and
  sending at least a portion of the set of clustered product information to the user as recommended product information.

18. The method of claim 17, wherein the plurality of information categories comprises a plurality of product categories, the set of clustered product information is determined based at least in part on extracting for a product category of the plurality of product categories, a set of keywords, and determining a cluster of pieces of product information included in the product category that include at least some of the set of keywords.

19. The method of claim 17, wherein at least the portion of the set of clustered product information is determined based at least in part on determining visit volumes and visit frequencies corresponding to the set of clustered product information and determining the portion of the set of clustered product information associated with visit volumes that are equal to or exceed a visit volume threshold value and associated with visit frequencies that are equal to or exceed a visit frequency threshold value.

20. A computer program product for classifying a user into a user group, the computer program product being embodied in a non-transitory computer readable storage medium and comprising computer instructions for:
  obtaining action record information associated with a user with respect to a plurality of information categories, the plurality of information categories including a first information category and a second information category;
  determining a plurality of preference values indicating the user's preferences for the plurality of information categories, the determination being made based at least in part on the action record information, the plurality of preference values including a first preference value and a second preference value, the first preference value relating to the first information category, the second preference value relating to the second information category;
  determining a demand preference dispersion value for the user based at least in part on the plurality of preference values, wherein the demand preference dispersion value represents a degree to which the user has dispersed interest across the plurality of information categories, and wherein the determining of the demand preference dispersion value comprises:
    comparing the first and second preference values each with a preference value threshold; and
    in the event that the first and second preference values both are greater than or equal to the preference value threshold:
      determining a first entropy value based at least in part on a formula and the first preference value;
      determining a second entropy value based at least in part on the formula and the second preference value; and
  determining whether the user is to be classified with a demand-focused user group based at least in part on the demand preference dispersion value.

21. The computer program product of claim 20, further comprising:

receiving an indication to recommend product information to the user;

determining that the user is associated with the demand-focused user group;

in response to the determination that the user is associated with the demand-focused user group, determining a set of clustered product information based at least in part on the action record information associated with the user; and sending at least a portion of the set of clustered product information to the user.

* * * * *